UNITED STATES PATENT OFFICE.

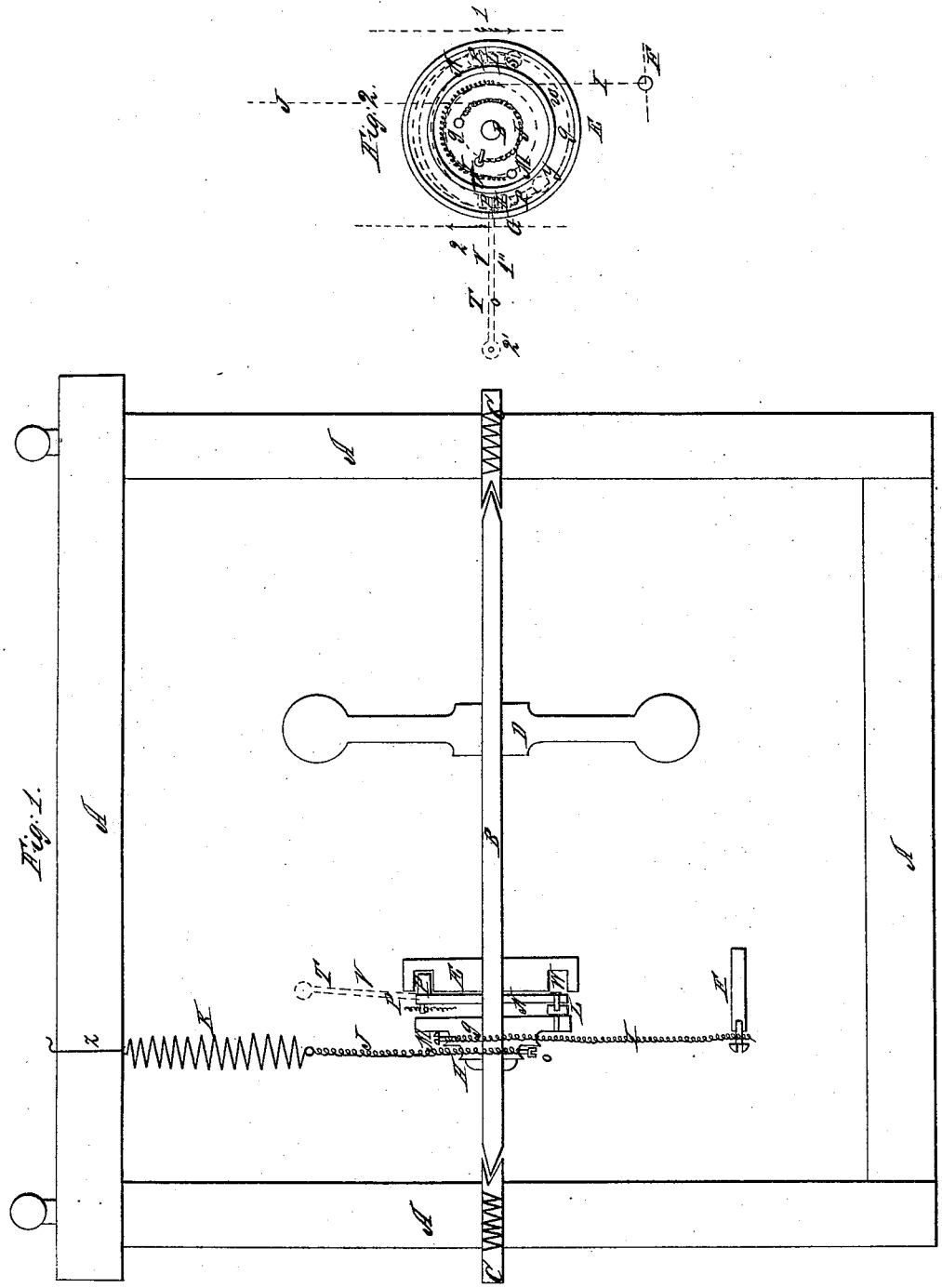
S. Ingersoll,
Machine Gearing.
Nº 20,800.     Patented July 6, 1858.

SIMON INGERSOLL, OF GREENWICH, CONNECTICUT.

IMPROVEMENT IN ROTATING SHAFTS WITHOUT USING A CRANK.

Specification forming part of Letters Patent No. 20,800, dated July 6, 1858.

*To all whom it may concern:*

Be it known that I, SIMON INGERSOLL, of the town of Greenwich, in the county of Garfield and State of Connecticut, have invented a new and Improved Mode of Rotating a Shaft Without the Use of a Crank; and I do declare that the following is a full and exact description thereof, reference being had to the accompanying drawings, and to the letters of reference marked thereon.

Figure 1 is a vertical section, and Fig. 2 a side elevation.

The nature of my invention consists in substituting in the place of the crank a wheel with a groove in the side, in which I fit a slide P, Fig. 2, with its lever N, which is curved sufficiently to allow of its crossing the face of the wheel and not come in contact with its shaft; otherwise the shaft would operate as a fulcrum, and when one end of lever N at R, Fig. 2, was drawn down the other end at P would fly up, or in the opposite direction to R, and would not rotate the shaft if it had any resistance to its rotation; but as this lever and its slide are operated it cannot slip only in the desired direction, for the reason that it is pulled directly opposite to the slip, which, although true, is somewhat paradoxical, for it is certain that the propelling force applied at R or link L acts in a directly opposite direction to the slide P, which causes a friction on the slide at $v\ v$, Fig. 2, so great that it cannot possibly slip only backward when the lever N at R is released, and the rubber spring at $q$ will then draw back the slide P and its hold is renewed again when R is propelled forward. Now, by crossing the wheel in this manner I gain two points of advantage. The first is the lever N is lengthened, and thereby more friction is gained at $v\ v$, Fig. 2, and the second is that the friction when gained is used in an opposite direction to the rotary movement of the wheel. It is plain to see that if you take hold of lever T, Fig. 2, no matter which way you pull the lever T you will unavoidably pull the slide P in the same direction. Hence it will help slide P to slip, whereas when lever N is used it prevents it. Then, again, the lever N will lengthen as I enlarge the diameter of the wheel E, and hence the friction will be equal to the size of the wheel at all times, whereas the lever T, although united at P the same as lever N is to slide P, will not enlarge or lengthen as the wheel enlarges, for it makes no difference where you apply the power on lever T, whether at the end at T or at the middle at V, the friction at P will be the same, or at $v\ v$, for if five pounds will drive the wheel at T ten pounds will drive it at V. Hence the friction at $v\ v$ is the same whether you have a large or a small wheel, which is not the case when the lever N is used, for the friction will keep pace with the size of the wheel unavoidably. Hence there is a great and a very material and essential difference between the present invention and that of any other known to me.

To enable others skilled in the art to make and use my invention, I will proceed to describe its construction and operation by referring to the drawings.

As this rotary movement can be applied to any lathe-shaft or grindstone or any other where a crank is now used, a description of the frame will be unnecessary, as the frame will always be adapted to the machine to be driven, whatever it may be. Therefore I will describe the movement more fully.

In the present drawings, A A A A will represent the frame; B, the shaft; C C, screws with ordinary steel points for shaft to run in; D, balance-wheel, belt-wheel, or grindstone, as the case may be; E, groove-wheel; P, slide working in groove $w$, (shown in Figs. 1 and 2—depth shown in Fig. 1 and length and breadth shown at P, Fig. 2;) N, lever welded to slide P and curved so as to pass across the face of the wheel to the side opposite $p$, (shown in Fig. 2,) and fastened to link L at R, and link L is fastened to pulley $g$ at $s$, Fig. 2. Groove-wheel E is fastened to shaft B, and pulley $g$ is movable, but kept in its place by nut H, Fig. 1. $q$ is a small spring attached to slide P and to pulley $g$ at $y$, Fig. 2; F, foot-board; I, strap attached to foot-board F and to pulley $g$ at M; J K, strap and spring attached to pulley $g$ at $o$, Figs. 1 and 2, and to frame A at $z$, Fig. 1; T, lever attached to P, Fig. 2, to show the difference of movement between lever T and lever N as being directly opposite each other. Lever N when used pulls opposite to the course of slide P, whereby lever T pulls slide P in the direction it must slip, while lever $n$ pulls opposite to the slip.

I will proceed to describe its operation. We will place the finger on foot-board F, Fig. 2, and press it down in the direction of the arrow, and it will pull down belt I, which is fastened to pulley $g$ at M, Figs. 1 and 2, and by pulling down on belt I you of course pull down belt $j$ and expand spring K, and you also pull along with the rest pulley $g$, and as link L is fast to pulley $g$ at S and to lever N at R you will of course pull lever N in the same direction as you do link L; but the effect of the pull at or on slide P is in an upward or opposite direction, and as slide P is longer than the groove in wheel E is wide it of course (P) cannot turn round in groove $w$, but will bind on two opposite points at $u$ $u$, Fig. 2, which will cause a friction equal to the pressure and more than equal to the resistance of the wheel E. Hence the wheel E and shaft B and slide P and pulley $g$ will all pass round together, and as you let up the finger at F, where you are pressing, the spring K will pull back pulley $g$, and as the spring $q$ is fast to slide P and to pulley $g$ it will pull back slide P with it, (pulley $g$,) which will cause a rise on foot-board at F and prepare it for another operation, and as the spring $q$ is only tight enough to keep slide P up to its place there cannot be but little friction when it is going back, which will be best seen by moving the top of balance-wheel forward, which shows but little friction. Hence the centrifugal force of the wheel is not stopped and moves on till the slide P gets hold again and foot-board F is pressed down again, and thus the motion will be kept up, as experiment will show.

I will now try and explain the difference between my invention and perhaps all others known to me, and it is simply the following: I will attach lever T to slide P instead of lever N, Fig. 2. I will cut lever N off, for instance. Now I will place the hand at T or V and press upward on T. It will bind slide P in groove $w$ at the same points as when lever N is used; but the power applied at T moves in the same direction as slide P. Consequently the very power applied to move your wheel will help the slide P to slip, for they both move in the same direction; but when the lever N is used the power and the friction work in opposite directions to each other. I have tried lever T for more than six years on a lathe for turning wood and iron, but could not make it hold for the want of friction, for although lever N and lever T are equidistant from the center of slide P the difference of friction is almost infinite. Hence I can use a large bearing on slide P at $v$ $v$ when lever N is used; but the bearing on slide P must be sharp when lever T is used or it will slip. Consequently it will either slip or cut the groove in which it runs all the while and soon wear out. When steam is applied to this movement, a rack and pinion will be attached in the place of pulley $g$, and in such case two slides like P will be necessary—one on each side of wheel E—so that when one slide is acting the other will be reacting and a regular movement will be kept up without the crank and its dead-center, and as the lever N necessarily lengthens as the wheel E is enlarged it will make no difference whether the wheel is large or small, as the friction at $v$ $v$ on P will be the same, always keeping pace with the size of the wheel E; but when lever T is used (which is done by enlarging pulley $g$ in diameter enough to bring it out to the lever T, where a pin is put through) and pulley $g$ and lever T are fastened together it will be fastened at Q' instead of at R; but for the want of friction on P at $v$ $v$ the wheel E will not move on if it has much resistance, for it makes no difference how long you make lever T the friction at P and $v$ $v$ will be the same, for if ten pounds will drive it at 1" five pounds will drive it at 2', so that the friction is the same whether the wheel be two inches or two feet in diameter.

Hoping that the above will be sufficient to illustrate my invention, I will not proceed farther with my description. Therefore I will briefly state upon what part of my invention I desire to secure Letters Patent, for it makes no difference whether slide P runs in a groove or whether it has a groove cut in it or a recess, as the friction and bearing are the same. Neither will work with lever T, but either will work with lever N, as described. Therefore,

What I claim as new, and desire to secure by Letters Patent, is—

The lever N, with its slide P, or its equivalent, when arranged in the manner described, and for the purpose set forth.

SIMON INGERSOLL.

Witnesses:
GEO. LOCKWOOD,
JONATHAN FINCH.